United States Patent [19]

Ishima

[11] Patent Number: 4,459,469
[45] Date of Patent: Jul. 10, 1984

[54] INK TEMPERATURE CONTROL APPARATUS FOR INK JET PRINTING APPARATUS

[75] Inventor: Kazumi Ishima, Tokyo, Japan
[73] Assignee: Ricoh Company, Ltd., Tokyo, Japan
[21] Appl. No.: 374,531
[22] Filed: May 3, 1982
[51] Int. Cl.³ .............................................. H05B 1/02
[52] U.S. Cl. .................................... 219/497; 219/330; 219/483; 219/501; 219/216; 219/505; 346/106
[58] Field of Search ................. 219/216 PH, 494, 497, 219/486, 499, 483, 501, 505, 328, 508, 330; 307/117; 346/140 R, 78, 106, 105

[56] References Cited

U.S. PATENT DOCUMENTS

| | | | |
|---|---|---|---|
| 3,999,190 | 12/1976 | Brown | 219/501 |
| 4,167,663 | 9/1979 | Granzow, Jr. et al. | 219/330 |
| 4,192,992 | 3/1980 | Stevens et al. | 219/328 |
| 4,356,383 | 10/1982 | Dahlberg et al. | 219/330 |

Primary Examiner—M. H. Paschall
Attorney, Agent, or Firm—David G. Alexander

[57] ABSTRACT

A liquid temperature control apparatus for an ink jet printer has a first ink temperature sensor located adjacent but at a spacing from an ink ejection head and a second ink temperature sensor mounted on a heater. The two sensors have an identical temperature coefficient. A voltage supply to the heater is controlled in accordance with a difference between a reference voltage and a sum voltage of outputs of the two sensors. The voltage supply to the heater is further controlled on the basis of an apparent reference voltage, which is a difference between an output voltage of the first sensor and a reference voltage which provides a predetermined temperature, and an output voltage of the second sensor.

The two sensors are located before and after the heater. The differential voltage is coupled to the heater after being power-amplified by a power element for output. The power element is mounted on a support member for supporting a filter which is positioned immediately ahead of the first sensor.

First and second temperature sensors are positioned before and after a first heater to sense temperatures of an ink before and after heated by the first heater, respectively. The ink temperature is controlled by a difference between a sum voltage of outputs of the sensors and a reference voltage which provides a predetermined temperature. A second heater substantially common in thermal time constant to the head is located immediately ahead of the first sensor.

15 Claims, 15 Drawing Figures

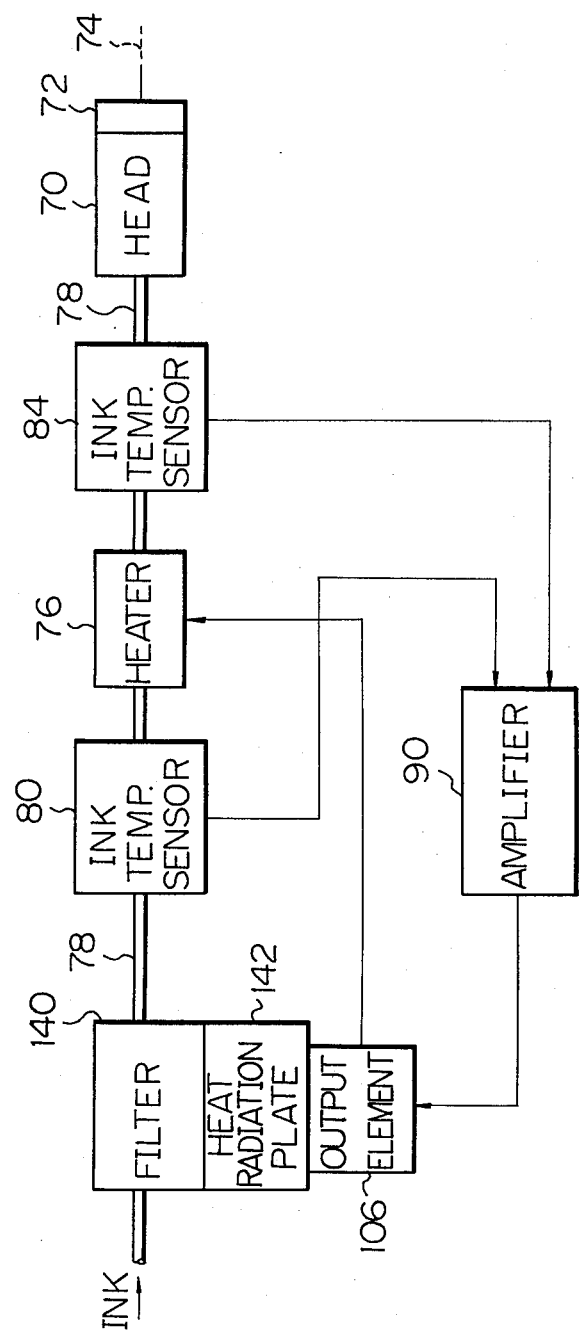

INK TEMPERATURE CONTROL APPARATUS FOR INK JET PRINTING APPARATUS

BACKGROUND OF THE INVENTION

The present invention relates to a liquid temperature control apparatus for controlling to a constant level the temperature of an ink ejected from a head of, for example, an ink jet printing apparatus.

In an ink jet printer, an ink supplied from an ink reservoir or tank is usually heated by a heater mounted on an ink supply tube, delivered to an ejection head via the tube, and then ejected from a nozzle of the head to form a string of ink droplets. The size of an ink droplet is largely dependent on the ink temperature and a change in the droplet size has critical influence on the quality of a pattern to be reproduced on a recording medium. With this in view, an ink jet printer is furnished with a liquid temperature control apparatus which controls the temperature of ink directed to the head to a predetermined level. Such an apparatus usually comprises a temperature sensor held in contact with the head to sense an ink temperature inside the head, and a controller for energizing the heater in accordance with an output of the temperature sensor.

A drawback inherent in a prior art liquid temperature control apparatus of the type described is that, since the heater mounted on the tube is spaced a substantial distance from the head, the sensor cannot sense an ink temperature without a delay which corresponds to a period of time consumed by the ink to flow through the distance up to the head. Because the flow rate of the ink is as small as 1 cc/min, several tens of seconds are necessary for the head to be heated up to a predetermined level by the hot incoming ink, so that a substantial period of time is consumed before the sensor senses a temperature elevation to the predetermined level. Accordingly, in case where the controller 18 is of the high speed response type, the ink temperature within the head tends to rise to an unusual level or even to a boiling point. Such a high ink temperature may burn the heater 20 or deteriorate the property of the ink. The sensor mounted in contact with the head may result a subtle change in the orientation of the head which is reflected by a change in the direction of ink ejection or an intricate construction of the ink jet printer.

These drawbacks may be eliminated by slowing down the response of the controller or regulating a voltage applied to the heater, as has been conventionally practiced. However, this accompanies a shortcoming that the temperature building of the ink ejected from the head is noticeably decelerated.

Another known type of liquid temperature control apparatus comprises a first temperature sensor located between the ink reservoir and the heater so as to sense an ink temperature before the ink is heated by the heater, a second temperature sensor mounted in contact with the heater, and a controller controlling power supplied to the heater in accordance with a difference between output voltages of the two sensors. This is neither acceptable due to a very slow thermal response which is attributable to the use of a power transistor as the heater and utilization of a collector loss which occurs upon supply of a current to the power transistor.

Such a slow buildup of the heater results in a disproportionate period of time which the ink directed to the head takes to be heated to the predetermined temperature, preventing a printing operation until the temperature becomes stable. This is usually coped with by a small sized design of the heater which speeds up the buildup of the heater. The head is made up of various parts such as a piezoelectric vibrator, a support member and a casing. When the ink jet printer is turned off, the head needs about 2–10 minutes to be cooled off naturally to the ambient level while the heater takes only about 30–60 seconds to be so cooled off. When the ink jet printer is turned on again after a short "off" period and the heater is heated as in the initial start-up (when the ink jet printer is first turned on), the temperature of ink flowing to the head becomes elevated beyond a temperature range permissible for printing operation. Thus, a quite longer waiting period is necessary for the ink flowing to the head to be cooled off to the specific range than in the initial condition of operation. Though this may be eliminated if a temperature sensor is mounted on the head, the sensor in this case will subtly affect the direction of ink ejection from the head due to its mechanical connection with the head by an electric wire. Also, the power transistor is large sized and therefore takes a substantial period of time to be heated. An additional and substantial time period is necessary to heat a member which transmits the temperature to the ink.

SUMMARY OF THE INVENTION

An ink temperature control apparatus an ink jet printing apparatus, which has an ink ejection head supplied with an ink from an ink reservoir, for controlling to a predetermined level the temperature of the ink to be ejected from the head. In one preferred embodiment, the apparatus comprises heater means disposed between the ink reservoir and the ink ejection head for heating the ink, first sensor means positioned adjacent to the ink ejection head for sensing a temperature of the ink in the head to produce a first output, second sensor means mounted on the heater means for sensing a temperature of the heater means to produce a second output, reference means for producing a reference output, heater drive circuit means for producing a variable heater drive power, and computing means for computing a difference between the reference output and the first and second outputs and controlling the heater drive circuit means to supply to the heat means the heater drive power which is varied depending on the computed difference.

In another preferred embodiment, the apparatus comprises primary heater means disposed between the ink reservoir and the ink ejection head for heating the ink, first sensor means disposed adjacent to the primary heater means between the ink reservoir and the primary heater means for sensing a temperature of the ink before the ink is heated by the primary heater means to produce a first output, second sensor means disposed adjacent to the first heater means between the head and the primary heater means for sensing a temperature of the ink after the ink is heated by the primary heater means to produce a second output, secondary heater means disposed between the ink reservoir and the first sensor means for heating the ink before the ink is heated by the primary heater means and before the first sensor means senses a temperature, reference means for producing a reference output, and computing means for computing a difference between the reference output and the first and second outputs and supplying to the primary heater means a heater drive power which is varied depending on the computed difference.

In accordance with the present invention, a liquid temperature control apparatus for an ink jet printer has a first ink temperature sensor located adjacent but at a spacing from an ink ejection head and a second ink temperature sensor mounted on a heater. The two sensors have an identical temperature coefficient. A voltage supply to the heater is controlled in accordance with a difference between a reference voltage and a sum voltage of outputs of the two sensors. The voltage supply to the heater is further controlled on the basis of an apparent reference voltages, which is a difference between an output voltage of the first sensor and a reference voltage which provides a predetermined temperature, and an output voltage of the second sensor.

The two sensors are located before and after the heater. The differential voltage is coupled to the heater after being power-amplified by a power element for output. The power element is mounted on a support member for supporting a filter which is positioned immediately ahead of the first sensor.

First and second temperature sensors are positioned before and after a first heater to sense temperatures of an ink before and after heated by the first heater, respectively. The ink temperature is controlled by a difference between a sum voltage of outputs of the sensors and a reference voltage which provides a predetermined temperature. A second heater substantially common in thermal time constant to the head is located immediately ahead of the first sensor.

It is an object of the present invention to provide a liquid temperature control apparatus which controls to a predetermined level the temperature of an ink ejected from the head of an ink jet printer regardless of the varying ambient temperature.

It is another object of the present invention to provide a liquid temperature control apparatus which causes a heater of an ink jet printer to efficiently and quickly heat an ink while minimizing a heat loss and, therefore, a power loss.

It is another object of the present invention to provide a liquid temperature control apparatus which eliminates overshooting of an ink even though an ink jet printer may be turned on after a short interruption, thereby shortening a stand-by period of the ink jet printer.

It is another object of the present invention to provide a generally improved liquid temperature control apparatus for an ink jet printing apparatus.

Other objects, together with the foregoing, are attained in the embodiments described in the following description and illustrated in the accompanying drawings.

BRIEF DESCRIPTION OF THE DRAWINGS

FIG. 14 shows still another embodiment of the invention.

DESCRIPTION OF THE PREFERRED EMBODIMENTS

While the liquid temperature control apparatus for an ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
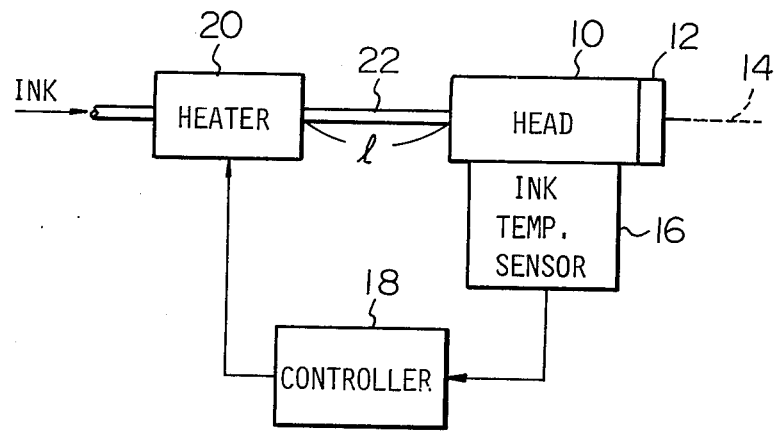
FIG. 1 is a schematic fragmentary view of an ink jet printer equipped with a prior art liquid temperature control apparatus.

Referring to FIG. 1 of the drawings, an ink jet printer and a prior art liquid temperature control apparatus associated therewith are illustrated. The ink jet printer includes an ink ejection head 10 having a nozzle 12 therewith. As well known in the art, a piezoelectric vibrator installed in the head 10 causes an ink to be constantly ejected from the nozzle 12. A stream of ink from the nozzle 12 is separated into a string of droplets 14 which are then selectively deposited with electrostatic charges. The charged or non-charged ink droplets are selected to reproduce desired patterns on a recording medium, while those droplets which do not join in the reproduction are collected for repeated used.

In view of the fact that the size of the ink droplets 14 varies with the ink temperature as previously stated, the ink jet printer is provided with a liquid temperature control apparatus which maintains the temperature of ink fed to the head 10 at a constant level to thereby ensure a constant quality of data reproduction on a recording medium. The liquid temperature control apparatus comprises a temperature sensor 16 and a controller 18. The temperature sensor 16 is mounted on the head 10 which is supplied with the ink from a heater 20 through an ink supply tube 22.

In such a prior art apparatus, the sensor 16 cannot sense a temperature at the head 10 without a time lag corresponding to a length l of the tube 22 which the hot ink from the heater 20 flows to the head 10. Due to the flow rate of the ink which is as small as 1 cc/min, several tens of seconds are necessary for the head 10 to be heated up to a predetermined level by the hot ink from the heater 20, so that a substantial period of time is consumed before the sensor 16 senses a temperature elevation to the predetermined level. Accordingly, in case where the controller 18 is of the high speed response type, the ink temperature inside the heater 20 tends to rise up to an unusual level or even to a boiling point. Such a high ink temperature may burn the heater 20 or deteriorate the property of the ink. The sensor mounted in direct contact with the head 10 may result a subtle change in the orientation of the head 10 which is reflected by a change in the direction of ink ejection or an intricate construction of the ink jet printer.

Figure 2:
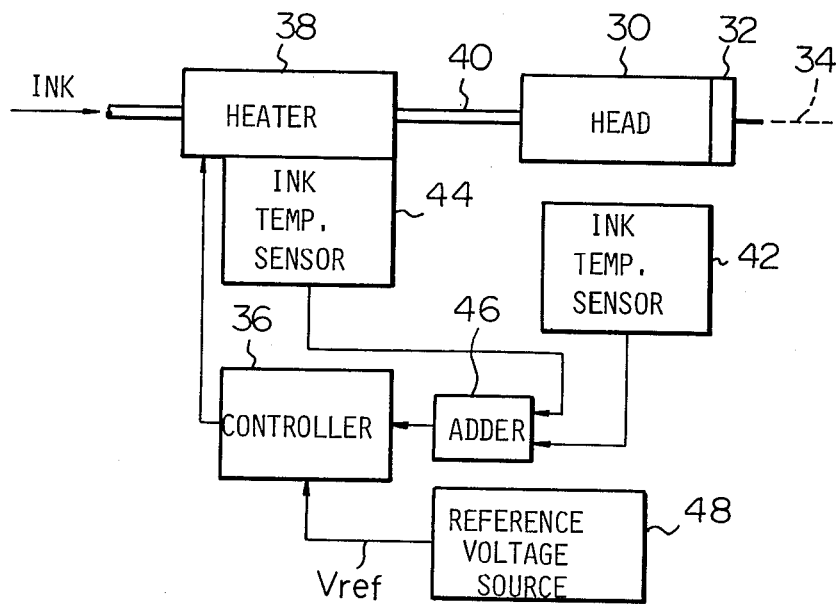
FIG. 2 is a schematic fragmentary view of an ink jet printer furnished with a liquid temperature control apparatus embodying the present invention.

Referring to FIG. 2, a liquid temperature control apparatus embodying the present invention includes a first temperature sensor 42 which is positioned at a spacing from an ink ejection head 30 to avoid its influence on the direction of ink ejection. A second temperature sensor 44 is mounted on a heater 38 which is communicated to the head 30 by an ink supply tube 40. A nozzle 32 is mounted on the head 10 to eject ink droplets 34 as usual. The outputs of the first and second temperature sensors 42 and 44 are coupled to an adder 46 whose output is in turn coupled to a controller 36. The controller 36 compares the output of the adder 46 with a reference voltage $V_{ref}$ supplied thereto from a reference voltage source 48, producing a control voltage for controlling the heater 38. The temperature sensors have a common temperature coefficient.

Figure 3:
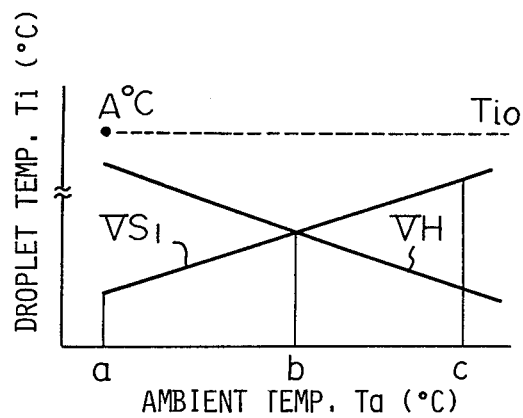
FIG. 3 is a diagram showing output voltages of various parts of the apparatus shown in FIG. 2.

The operation of the liquid temperature control apparatus shown in FIG. 2 will be described with reference to FIG. 3. Suppose that the ink comes out from the head 30 at a temperature A°C. when the ambient temperature Ta is a°C. The controller 36 supplies the heater 38 with a voltage such that the following equations hold:

$$VS_1 + VS_2 \approx V_{ref}$$

$$V_{ref} - (VS_1 VS_2) \approx 0$$

where $VS_1$ denotes an output voltage of the first temperature sensor 42, $VS_2$ an output voltage of the second temperature sensor 44 and $V_{ref}$ a temperature setting voltage of the controller 36. Upon elevation of the ambient temperature from a°C. to b°C., the variation of $\Delta Ta$ of the ambient temperature Ta which is expressed as $$\Delta Ta = (b-a)°C.$$

is sensed by the first temperature sensor 42. As a result, the output voltage of the sensor 42 rises in proportion to the temperature variation $\Delta Ta$. Then the controller 36 lowers the voltage supply $V_H$ to the heater 38 such that the output voltage of the second temperature sensor 44 is lowered by an amount corresponding to the temperature variation $\Delta Ta$. Thus, the temperature Ti of the ink ejected from the head 30 is maintained at a constant level Tio. Likewise, as the ambient temperature further rises from b°C. up to c°C., the controller 36 operates to lower the output voltage of the second temperature sensor 44 in inverse proportion to the temperature variation. Upon drop of the ambient temperature, on the other hand, the voltage supply $V_H$ to the heater 38 is increased to keep the temperature Ti of the ink ejected from the head 30 at the constant level Tio.

It will be seen from the above that the first temperature sensor 42 spaced from the head 30 permits the ink from the head 30 to remain at a constant temperature regardless of the ambient temperature. The second temperature sensor 44 is effective to suppress the maximum ink temperature and, therefore, promotes safety operation without overheating the ink or burning the heater 38.

Each of the temperature sensors 42 and 44 may comprise a temperature sensitive resistor through which a given current is caused to flow to pick out a voltage which develops thereacross, or of the type which utilizes the temperature characteristic of a base-emitter voltage $V_{be}$ of a transistor. Preferably, the temperature sensors 42 and 44 have an identical temperature coefficient while the heater 38 responds as quick as possible to heat. While the first temperature sensor 42 should preferably be spaced from the head 30 as illustrated, it may be mounted on the head 30, if desired, insofar as it does not affect the direction of ink ejection or render the structure around the head intricate.

Figure 4:
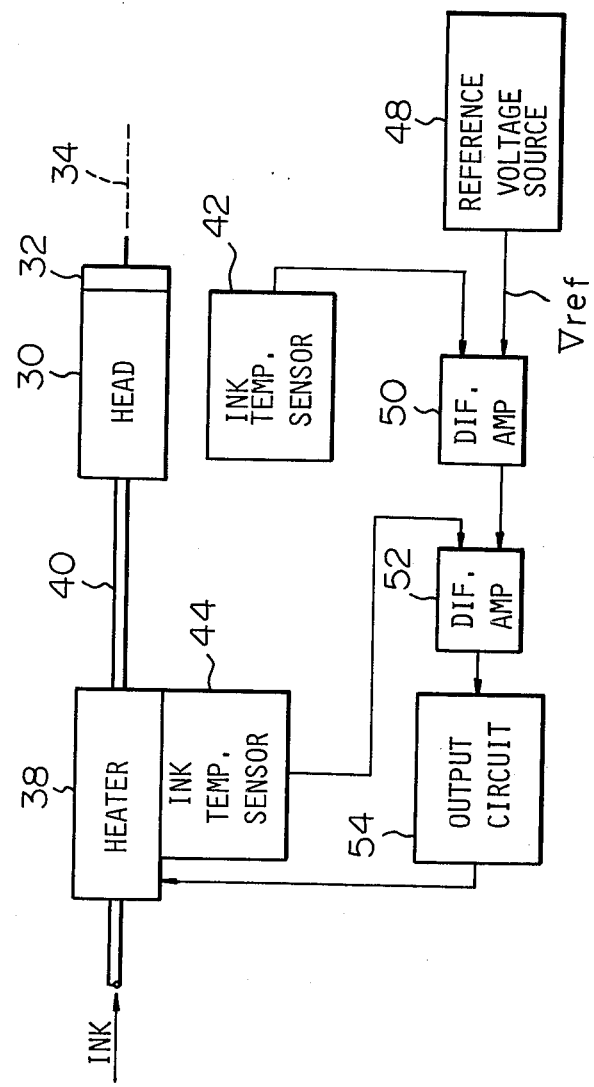
FIG. 4 is a schematic fragmentary view of another embodiment of the present invention.

Referring to FIG. 4, another embodiment of the present invention is shown and associated with the same ink jet printer as shown in FIG. 2. In FIG. 4, the same reference numerals as those of FIG. 2 indicate the same parts and elements. As shown, a differential amplifier 50 produces an output voltage which represents a difference between an output voltage of the first temperature sensor 42 and the reference voltage $V_{ref}$ from the reference voltage source 48. A second differential amplifier 52 is connected with the first 50 and the second temperature sensor 44 in order to amplify a differential voltage between the two inputs up to a level easy to treat. An output circuit 54 power-amplifies an output voltage of the differential amplifier 52 before the latter reaches the heater 38.

The apparatus having the above construction will be operated as follows.

Figure 5:
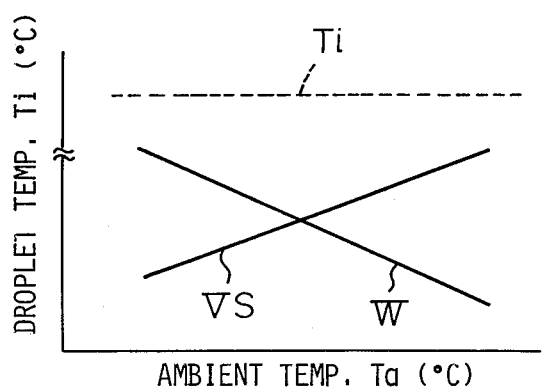
FIG. 5 is a diagram showing output voltages of various parts of the apparatus of FIG. 4.

Referring also to FIG. 5, at a buildup of the heater 38, the first temperature sensor 42 is at a substantially ambient temperature so that its output voltage VS little varies. In this situation, the heater 38 is controlled in accordance with an output voltage of the second temperature sensor 44. As the head 30 is progressively heated to elevate the ambient temperature Ta therewith, the output voltage VS of the first temperature sensor 42 rises and the output voltage (apparent reference voltage) indicative of the difference between the reference voltage $V_{ref}$ and the output of the differential amplifier 50 drops. As a result, the power W fed to the heater 38 is decreased to in turn lower the operating temperature of the heater 38 until the output voltage of the differential amplifier 50 and that of the second temperature sensor 44 become equilibrated. The ink temperature Ti therefore is controlled to the constant level. Upon change of the ambient temperature, it is sensed by the first temperature sensor 42. When the ambient temperature rises, for example, the apparent reference voltage is lowered and the voltage supply to the heater 38 is so controlled as to lower the operating temperature of the heater 38. Conversely, as the ambient temperature drops, the apparent reference voltage is raised to elevate the operating heater temperature. In any case, the head 30 is supplied with the ink at a constant temperature Ti.

In this way, the second temperature sensor 44 regulates the buildup temperature of the heater 38 so that the latter is prevented from being overheated or burned. The head 30 is free from mechanical stresses due to the spaced location of the first temperature sensor 42, preserving the predetermined direction of ink ejection. Furthermore, the ink flowing to the head 30 can be kept at a constant temperature despite any change of the ambient temperature.

Again, the first temperature sensor 42 may be positioned in contact with the head 30 as long as it does not affect the direction of ink ejection from the nozzle 32.

Figure 6:
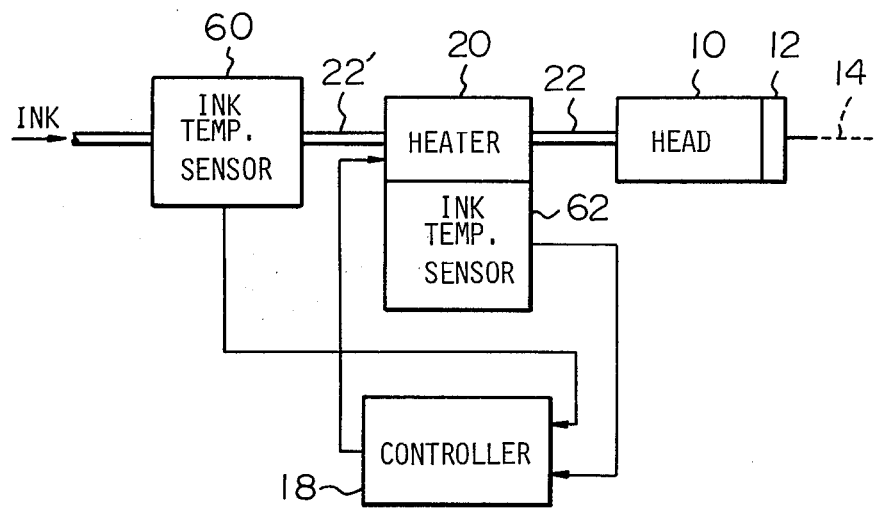
FIG. 6 is a view of another prior art liquid temperature control apparatus.

Referring to FIG. 6, another type of prior art liquid temperature control apparatus for an ink jet printer will be described. In FIG. 6, the same reference numerals as those of FIG. 1 denote the same parts and elements.

In FIG. 6, the heater 20 heats an ink and then supplies the hot ink to the ink ejection head 10 via an ink supply tube 22'. A first temperature sensor 60 is positioned on the tube 22' to sense a temperature of the ink ahead of the heater 20. A second temperature sensor 62 is mounted on the heater 20.

In operation, the first temperature sensor 60 senses a temperature of ink before the latter is heated by the heater 20, while the second temperature sensor 62 senses a temperature of the hot ink. The power supply to the heater 20 is controlled based on a difference between output voltages of the sensors 60 and 62.

However, since the apparatus of FIG. 6 uses a power transistor as the heater and utilizes a collector loss caused by a current flowing through the transistor, it is quite slow in response and a disproportionate period of time is necessary for the transistor to be heated due to its bulky design. An additional and substantial period of time is required to heat a member for transmitting heat to the ink.

Such a slow buildup of the heater 20 results in the consumption of a long period of time before the ink flowing to the head 10 is heated. With this in view, the heater 20 is usually designed to have a minimum of volume so that it can build up within a short period of time. This brings about a new problem, however.

Figure 7:
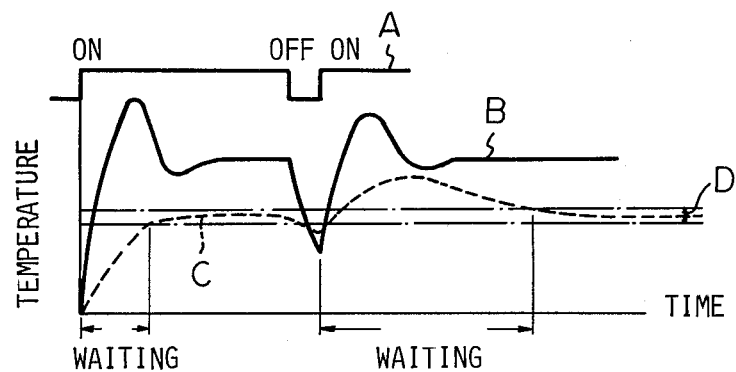
FIG. 7 is a diagram representing an operation of the apparatus shown in FIG. 6.

The head 10 is made up of various parts such as a piezoelectric vibrator, a support member and a casing. When the ink jet printer is turned off, the head 10 needs about 2-10 minutes to be cooled off naturally to the ambient level while the heater 20 takes only 30-60 seconds to be so cooled off. When the ink jet printer is turned on again after a short "off" period as indicated by a waveform A in FIG. 7 and the heater 20 is heated as in the initial start-up, the temperature of ink flowing to the head 10 becomes elevated as indicated by a curve C in FIG. 7 beyond a temperature range allowable for printing operation which is indicated by D in FIG. 7. Thus, quite a longer waiting period is necessary for the ink flowing to the head 10 to be cooled off to the specific range D than in the initial condition of operation. Though this may be eliminated if a temperature sensor is mounted on the head 10, the sensor in this case will subtly affect the direction of ink ejection from the head 10 due to its mechanical connection with the head 10 through an electric wire.

Figure 8:
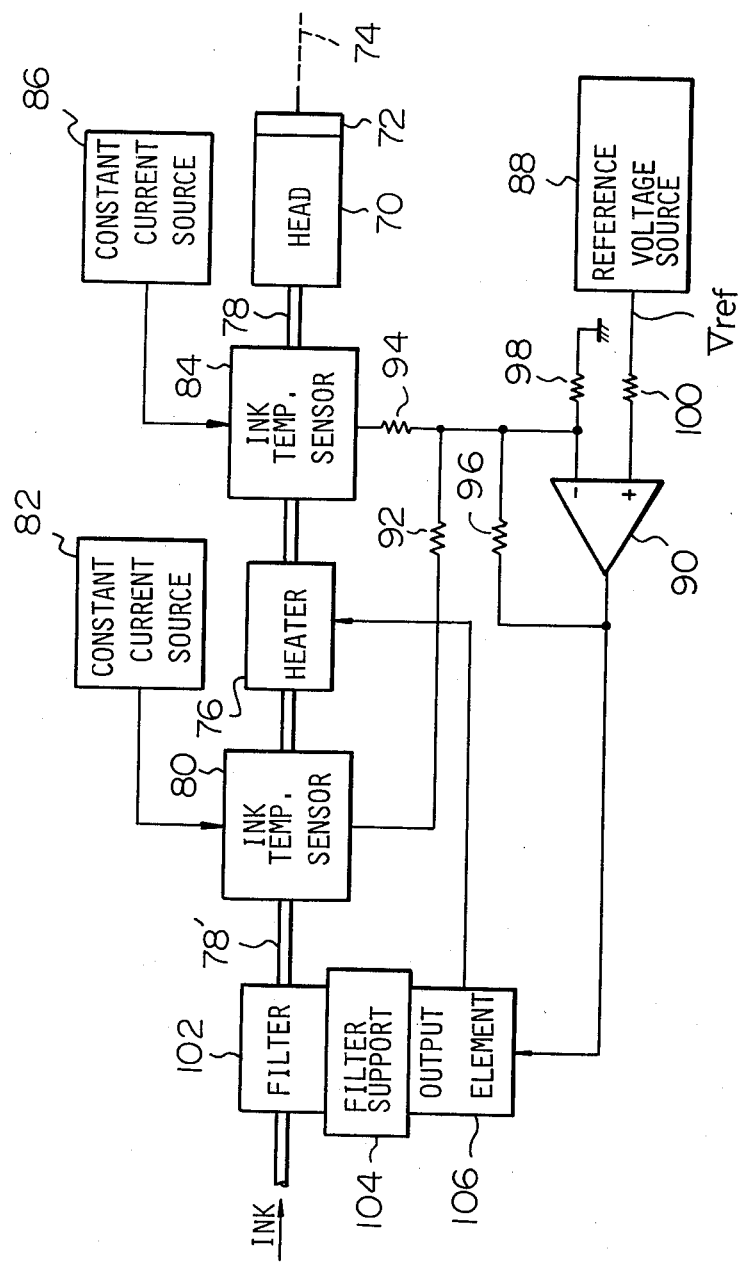
FIG. 8 is a view of another embodiment of the present invention.
Figure 9A:
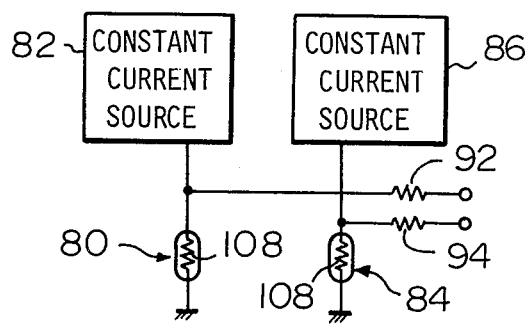
FIGS. 9a and 9b are circuit diagrams showing examples of first and second temperature sensors.
Figure 9B:
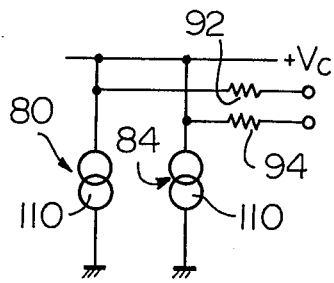

Referring to FIG. 8, there is shown another embodiment of the present invention which is designed for overcoming the drawback inherent in the construction of FIG. 6. As shown, an ink jet printer includes a head 70, a nozzle 72 ejecting ink droplets 74, a heater 76 and ink supply tubes 78 and 78'. The control apparatus, on the other hand, comprises a first temperature sensor 80 sensing an ink temperature in a position ahead of the heater 76, a constant current source 82 supplying a constant current to the first temperature sensor, a second temperature sensor 84 sensing an ink temperature in a position past of the heater 76 and a constant current source 86 supplying a constant current to the second temperature sensor 84. The control apparatus also comprises a reference voltage source 88 generating a reference voltage $V_{ref}$ which sets up a predetermined temperature, and an error amplifier 90. The outputs of the first and second temperature sensors 80 and 84 are coupled to an inverting input terminal of the error amplifier 90 via resistors 92 and 94, respectively. The output of the error amplifier 90 is fed back to the inverting input terminal via a resistor 96. The inverting input terminal of the error amplifier 90 is grounded through a resistor 98. The reference voltage source 88 is connected to a non-inverting input terminal of the error amplifier 90 via a resistor 100. A filter 102 is provided to the tube 78' and supported by a filter support 102. The support 102 also holds a power element for output 106 thereon. The output of the error amplifier 90 is fed to the power element 106 whose output is in turn fed to the heater 76. The filter 102 is adapted to prevent fine particles of dust from being carried by the ink into the nozzle 72 of the head 70, and it is made of such a material as SUS which has good heat transmission characteristics and liquid-contact characteristics. The power element 106 consists of a semiconductor, e.g. a transistor, which supplies power to the heater 76. The filter 102 and power element 106 are coupled together either thermally or mechanically by the support 104 which has good heat transmission characteristics. The filter 102 is mechanically secured to the support 104. The volume of the heater 76 is designed very small to speed up its thermal response. The temperature coefficients of the temperature sensors 80 and 84 are selected to be positive and identical with each other. The temperature sensors 80 and 84 may comprise temperature sensitive resistors 108 as shown in FIG. 9a or semiconductive temperature sensing elements 110 as shown in FIG. 9b.

Figure 10:
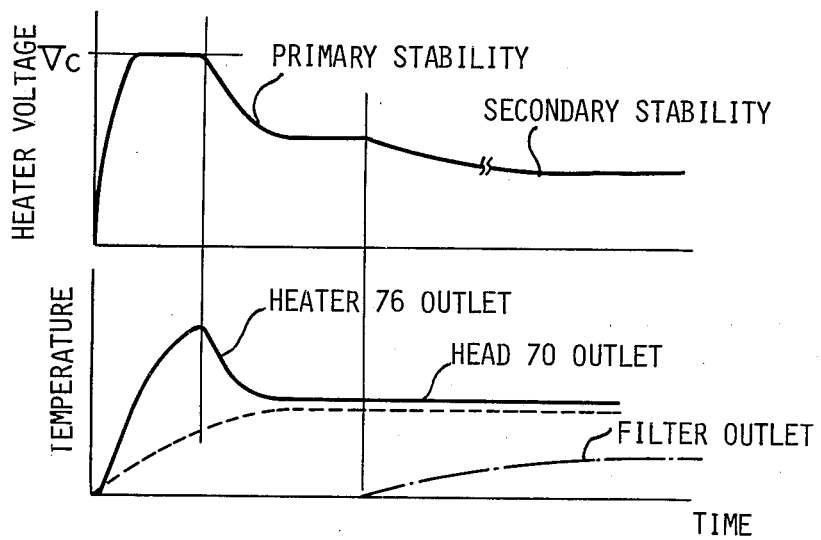
FIG. 10 is a diagram representing an operation of the apparatus shown in FIG. 8.

Referring to FIGS. 8 and 10, at the initial stage of a heating operation, the heater 76 is supplied with a voltage which is substantially equal to the power source voltage. However, the heater 76 soon reaches its usual operable state due to the very quick buildup.

The voltage $V_L$ and current $I_L$ supplied to the heater 76 immediately after the power supply is expressed as:

$$V_L = V_C - V_{CE}, \quad V_{CE} \approx 0$$

therefore $$V_L = 25V - 0 = 25 \text{ V}$$

$$I_L \approx V_C/RH \approx I_C$$

where RH denotes the heater resistance which is assumed to be 10 ohms herein, $V_C$ the collector voltage of the power element 106, $V_{CE}$ the collector-emitter voltage of the power element 106 and $P_C$ the collector loss of the power element 106. The collector loss $P_C$ of the power element 106 is given by $$P_C = V_{VE} \times I_C$$

therefore $$P_C = (V_C - V_L) \cdot V_C/RH$$

Since $V_C - V_L \approx 0$, the collector loss $P_C$ can be taken as $$P_C \approx 0$$

Thus, the temperature of the power element 106 is hardly elevated.

Suppose that the voltage $V_L$ is 10 V when a primary stable condition is reached. Then, the collector-emitter voltage $V_{ce}$ is 15 V and the current is 1A so that the collector loss $P_C$ is 15 W, causing the power element 106 to rapidly generate heat. This heat is imparted to the ink through the filter support 104 which in this instance serves as a radiator, and then sensed by the first temperature sensor 80. The outputs of the first and second temperature sensors 80 and 84 are coupled to the error amplifier 90 to be added thereby. Hence, when the ink is heated by the heat generation of the power element 106, the output voltage of the second temperature sensor 84 can be regarded as having varied. Accordingly, while the output voltage of the error amplifier 90 starts lowering progressively, the temperature of ink coming out from the heater 76 remains the same. At the time when the sum of the difference between the calorific value provided by the power element 106 and the heat transmission loss to the ink at the filter 102 and the calorific value provided by the heater 76 has reached the primary stable condition shown in FIG. 10, a secondary stable condition is set up.

In the prior art liquid control apparatus, the heat loss of a power element is substantial when a usual operative state is reached. This has to be coped with by employing a large power element or a quite large radiator for the power element as well as an additional cooling means, which is disadvantageous from the viewpoint of economy and space. In contrast, the apparatus of FIG. 8 needs a minimum of power consumption because it can collect heat which has been wasted as unnecessary heat. Meanwhile, the power element can be made very small due to the forced cooling; experiments shown that a support member 104 of about 20×20 mm in size suffices in this embodiment, which is contrastive to an aluminum plate of as large as about 100×100 mm required as a radiator in the case of natural cooling.

Figure 11:
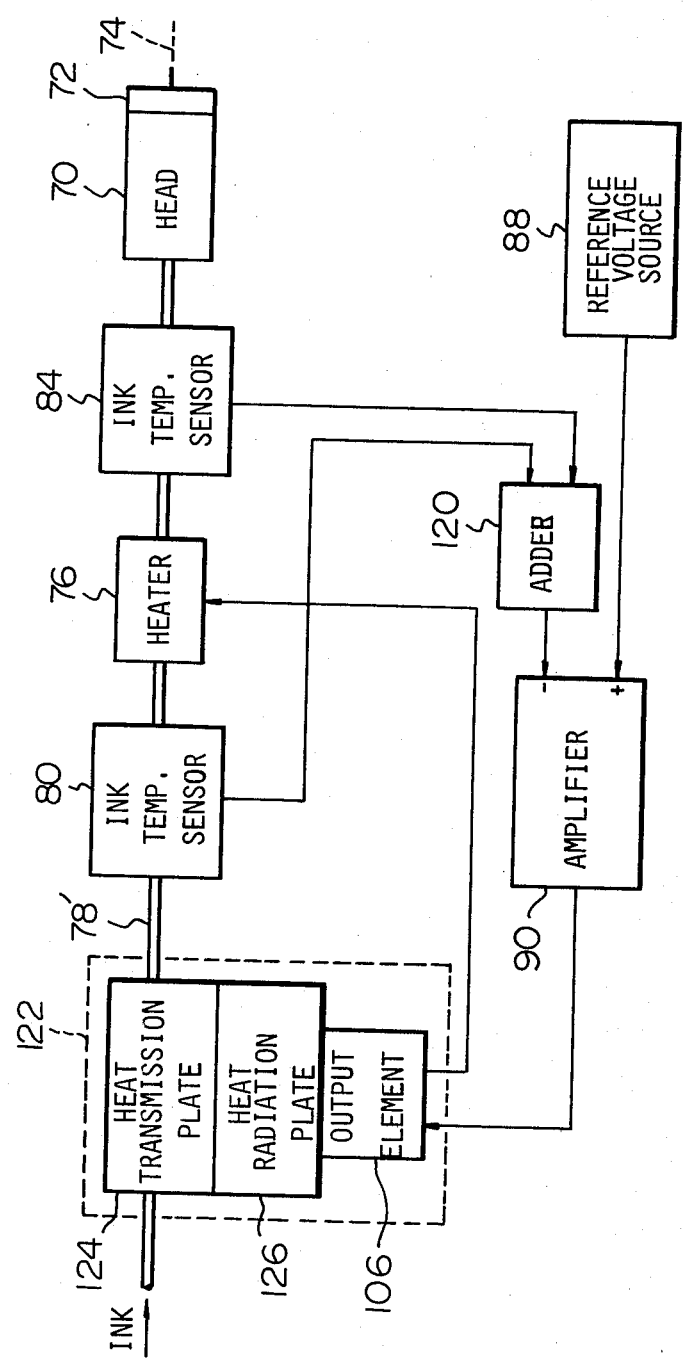
FIG. 11 is a view showing still another embodiment of the present invention.

Referring to FIG. 11, another embodiment of the present invention is shown which also eliminates the drawback inherent in the prior art construction of FIG. 6. In FIG. 11, the same parts and elements as those of FIG. 6 are denoted by the same reference numerals. A second heater 122 is made up of a heat transmission plate 124 mounted on the tube 78', a radiator plate 126 and the power element for output 106. The outputs of the first and second sensors 90 and 84 are added together by an adder 120. The first heater 76 is controlled on the basis of a difference between an output of the adder 120 and the reference voltage $V_{ref}$ provided by the reference voltage source 88. Comprising a transistor, the power element 106 operates as a heater during a normal control. The second heater 122 is so constructed as to heat the ink through the radiator 126 and transmission plate 124. The heat capacity of the second heater 122 is substantially identical with that of the head section, and the heat capacity of the first heater 76 is selected to be very small.

Figure 12:
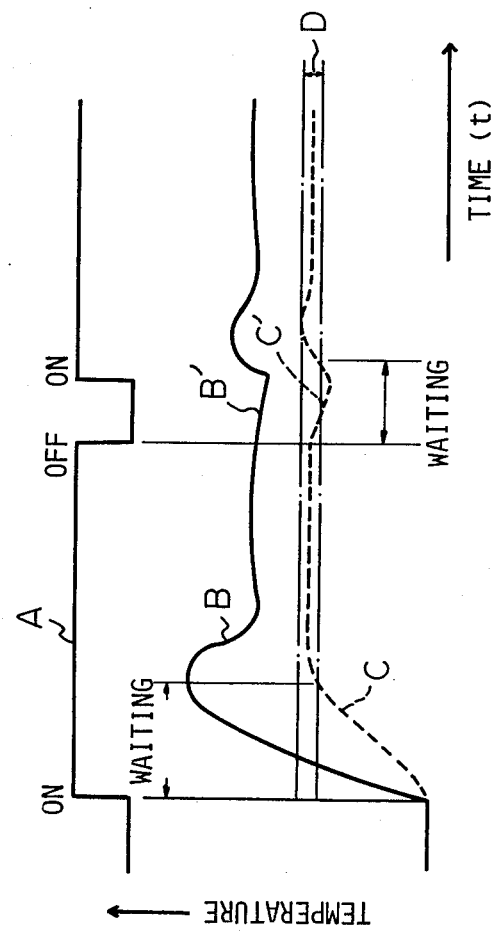
FIGS. 12 and 13 are views showing farther embodiments of the present invention, respectively.

In the liquid control apparatus shown in FIG. 11, when a power source is turned on as indicated by a waveform A in FIG. 12, the first heater 76 quickly builds up the temperature as indicated by a curve B in FIG. 12 while, at the same time, the ink flowing to the head 70 is smoothly heated up to a specific range (see D in FIG. 12) allowable for printing operation as indicated by a curve C in FIG. 12. When the power source is turned on after a short "off" period as also indicated by the waveform A, the temperature of the heater 76 and that of the ink are caused to drop in parallel relation during the "off" period as indicated by curves B' and C' with the aid of the heat accumulation effect of the second heater 122 and the like. Under this condition, the second temperature sensor 84 will have sensed substantially the same temperature as that of the head 70. Hence, the temperature of ink directed to the head 70 is stabilized without any overshooting to a significant extent and the stand-by period is noticeably shortened.

Figure 13:
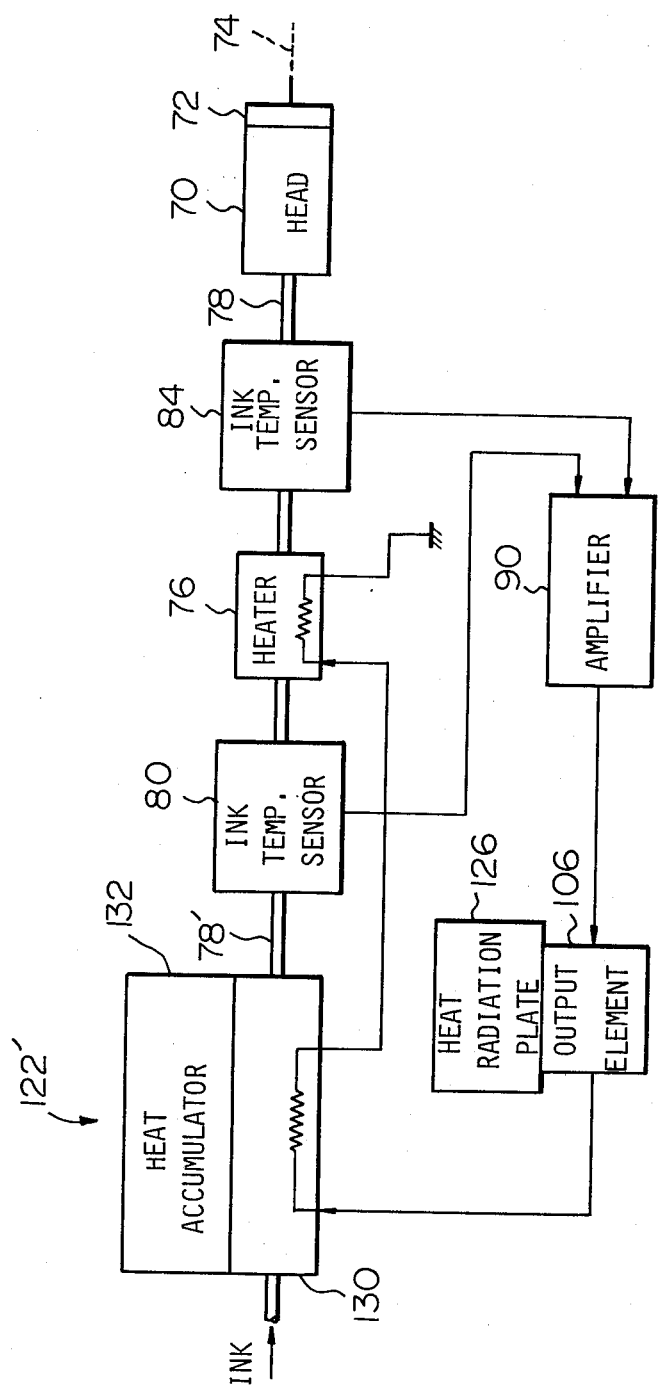

Referring to FIG. 13, still another embodiment of the present invention is shown in which the same parts and elements as those of FIG. 11 are designated by the same reference numerals. As shown, a second heater 122' comprises a heat accumulator 132 having a heater 130 built therein. The power element 106 and radiator 126, which have been included in the second heater 122, are located independent of the tubes 78 and 78'.

The effect achievable with the construction and arrangement shown in FIG. 13 is comparable with that provided by the embodiment of FIG. 11.

A farther embodiment of the present invention is shown in FIG. 14. In this embodiment, the second heater includes a filter 140 connected with the tube 78' and having a casing which is made of metal or good thermal conductor. A radiator plate 142 is adhered to the casing of the filter 140. Heat generated by the power element 106 is transmitted to the ink via the radiator 142 and the casing of the filter 140. This type of arrangement attains the same effect as in the arrangement of FIG. 11. The radiator 142 may bifunction as a support member for the filter 140 in order to reduce the number of component parts and thereby further enhance the economy.

Various modifications will become possible for those skilled in the art after receiving the teachings of the present disclosure without departing from the scope thereof.

What is claimed is:

1. In an ink jet printing apparatus having an ink ejection head, an ink reservoir containing ink and an ink supply tube operatively connecting the head to the reservoir; an ink temperature control apparatus for controlling to a predetermined level a temperature of ink to be ejected from the head, comprising:
   heater means disposed between the ink reservoir and the ink ejection head for heating the ink in the tube, the heater means being spaced remotely from the head;
   first sensor means positioned adjacent to the ink ejection head for sensing a temperature of the ink in the head to produce a first output;
   second sensor means mounted on the heater means for sensing a temperature of the heater means to produce a second output;
   reference means for producing a reference output;
   heater drive circuit means for producing a variable heater drive power; and
   computing means for computing a difference between the reference output and the first and second outputs and controlling the heater drive circuit means to supply to the heater means the heater drive power which is varied depending on the computed difference.

2. An ink temperature control apparatus as claimed in claim 1, in which the temperature coefficient of the first sensor means is the same as the second sensor means.

3. An ink temperature control apparatus as claimed in claim 1, in which the first sensor means is disposed at a spacing from the head.

4. An ink temperature control apparatus as claimed in claim 1, in which the computing means comprises an adder for adding the first and second outputs to produce a sum output, the heater drive power being varied depending on a differential output between the reference output and the sum output.

5. An ink temperature control apparatus as claimed in claim 1, in which the computing means comprises a first differential amplifier for comparing the first output with the reference output to produce a first differential output and a second differential amplifier for comparing the second output with the first differential output to produce a second differential output, the second differential output being applied to the heater drive circuit means.

6. In an ink jet printing apparatus having an ink ejection head and an ink reservoir containing ink for supply to the head; an ink temperature control apparatus for controlling to a predetermined level a temperature of ink to be ejected from the head, comprising:

primary heater means disposed between the ink reservoir and the ink ejection head for heating the ink;

first sensor means disposed adjacent to the primary heater means between the ink reservoir and the primary heater means for sensing a temperature of the ink before the ink is heated by the primary heater means to produce a first output;

second sensor means disposed adjacent to the first heater means between the head and primary heater means for sensing a temperature of the ink after the ink is heated by the primary heater means to produce a second output;

secondary heater means disposed between the ink reservoir and the first sensor means for heating the ink before the ink is heated by the primary heater means and before the first sensor means senses a temperature;

reference means for producing a reference output; and computing means for computing a difference between the reference output and the first and second outputs and supplying to the primary heater means a heater drive power which is varied depending on the computed difference; p1 the secondary heater means comprising a heater drive power output element for producing the heater drive power while generating heat.

7. An ink temperature control apparatus as claimed in claim 6, in which the temperature coefficient of the first sensor means is the same as the second sensor means.

8. An ink temperature control apparatus as claimed in claim 6, in which the computing means comprises a differential amplifier for comparing the sum of the first and second outputs with the reference output to produce a differential output, the heater drive power being varied depending on the differential output.

9. An ink temperature control apparatus as claimed in claim 6, in which the secondary heater means further comprises a support member for supporting the heater drive power output element and transmitting the heat generated by the heater drive power output element to the ink.

10. An ink temperature control apparatus as claimed in claim 9, in which the secondary heater means further comprises a filter disposed between the ink reservoir and the first sensor means for filtering the ink, the filter being supported by the support member.

11. An ink temperature control apparatus as claimed in claim 6, in which the secondary heater means comprises a heat radiation plate which supports the heater drive power output element and transmits the heat generated by the heater drive power output element to the ink.

12. An ink temperature control apparatus as claimed in claim 11, in which the secondary heater means further comprises a heat accumulating plate disposed between the ink reservoir and the first sensor means.

13. An ink temperature control apparatus as claimed in claim 11, in which the secondary heater means further comprises a filter disposed between the ink reservoir and the first sensor means for filtering the ink.

14. An ink temperature control apparatus as claimed in claim 6, in which the secondary heater means comprises a heat radiation plate disposed between the ink reservoir and the first sensor means and a heater for heating the ink when supplied with the heater drive power from the heater drive power output element.

15. An ink temperature control apparatus as claimed in claim 14, in which the secondary heater means further comprises a heat radiation plate which supports the heater drive power output element.

* * * * *